(12) United States Patent
Crombez et al.

US011498429B2

(10) Patent No.: US 11,498,429 B2
(45) Date of Patent: Nov. 15, 2022

(54) AGGREGATING BRAKING TORQUE DURING ONE-PEDAL DRIVE MODE

(71) Applicant: FORD GLOBAL TECHNOLOGIES, LLC, Dearborn, MI (US)

(72) Inventors: Dale Scott Crombez, Livonia, MI (US); Bryan Michael Bolger, Canton, MI (US); Alexander McCollough, Northville, MI (US); Sergey Gennadievich Semenov, Farmington Hills, MI (US); Brandon Jay Woodland, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 255 days.

(21) Appl. No.: 17/035,035

(22) Filed: Sep. 28, 2020

(65) Prior Publication Data

US 2022/0097528 A1 Mar. 31, 2022

(51) Int. Cl.
*B60L 7/26* (2006.01)
*B60T 8/17* (2006.01)
(Continued)

(52) U.S. Cl.
CPC ............... *B60L 7/26* (2013.01); *B60T 8/17* (2013.01); *B60T 8/3215* (2013.01); *B60W 10/06* (2013.01); *B60W 10/08* (2013.01); *B60W 10/184* (2013.01); *B60W 10/196* (2013.01); *B60W 30/18127* (2013.01); *B60W 30/18136* (2013.01); *B60T 2270/604* (2013.01);
(Continued)

(58) Field of Classification Search
CPC . B60L 7/26; B60T 8/17; B60T 8/3215; B60T 2270/604; B60W 10/06; B60W 10/08; B60W 10/184; B60W 10/196; B60W 30/18127; B60W 30/18136; B60W 2510/0657; B60W 2510/083; B60W 2710/0666; B60W 2710/083; B60W 2710/18
See application file for complete search history.

(56) References Cited

U.S. PATENT DOCUMENTS 8,594,867 B2 11/2013 Heap et al.
10,071,724 B2 9/2018 Zhao et al.
(Continued)

FOREIGN PATENT DOCUMENTS

KR 101618453 B1 5/2016

*Primary Examiner* — Edwin A Young
(74) *Attorney, Agent, or Firm* — David B Kelley; Brooks Kushman P.C.

(57) ABSTRACT

A vehicle includes a powertrain having an electric machine configured to power driven wheels, an accelerator pedal, and friction brakes. A vehicle controller is programmed to, with the vehicle being in a one-pedal driving mode: in response to a braking torque capacity of the powertrain exceeding a target braking torque that is based on a position of the accelerator pedal, command a torque, that is equal to the target braking torque, from the powertrain such that the vehicle is slowed using the powertrain without application of the friction brakes, and, in response to the braking torque capacity of the powertrain being less than the target braking torque, command torques from the powertrain and the friction brakes such that the target braking torque is satisfied and the vehicle is slowed using the powertrain and the friction brakes.

20 Claims, 3 Drawing Sheets

(51) Int. Cl.
  *B60W 10/06*     (2006.01)
  *B60W 10/184*    (2012.01)
  *B60W 30/18*     (2012.01)
  *B60W 10/196*    (2012.01)
  *B60W 10/08*     (2006.01)
  *B60T 8/32*      (2006.01)

(52) U.S. Cl.
  CPC .............. *B60W 2510/0657* (2013.01); *B60W 2510/083* (2013.01); *B60W 2710/0666* (2013.01); *B60W 2710/083* (2013.01); *B60W 2710/18* (2013.01)

(56) References Cited

U.S. PATENT DOCUMENTS

| | | | |
|---|---|---|---|
| 2018/0186352 A1* | 7/2018 | Goto | B60T 8/00 |
| 2018/0304869 A1* | 10/2018 | Hernandez | B60T 7/042 |
| 2019/0135244 A1* | 5/2019 | Shiozawa | B60T 8/32 |
| 2020/0047761 A1* | 2/2020 | Tsuda | B60K 6/445 |
| 2020/0317197 A1* | 10/2020 | Kubo | B60W 50/14 |
| 2020/0339081 A1* | 10/2020 | Suzuki | F16D 61/00 |
| 2022/0009355 A1* | 1/2022 | Kim | B60L 53/68 |

* cited by examiner

AGGREGATING BRAKING TORQUE DURING ONE-PEDAL DRIVE MODE

TECHNICAL FIELD

This disclosure relates to electric vehicles having a one-pedal driving mode and more specifically to aggregating a target braking torque between a powertrain and friction brakes during the one-pedal mode.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power.

SUMMARY

According to an embodiment, a vehicle includes a powertrain having an electric machine configured to power driven wheels, an accelerator pedal, and friction brakes. A vehicle controller is programmed to, with the vehicle being in a one-pedal driving mode: in response to a braking torque capacity of the powertrain exceeding a target braking torque that is based on a position of the accelerator pedal, command a torque, that is equal to the target braking torque, from the powertrain such that the vehicle is slowed using the powertrain without application of the friction brakes, and, in response to the braking torque capacity of the powertrain being less than the target braking torque, command torques from the powertrain and the friction brakes such that the target braking torque is satisfied and the vehicle is slowed using the powertrain and the friction brakes.

According to a further embodiment, a vehicle includes a powertrain having an electric machine configured to power driven wheels. A vehicle controller is programmed to, with the vehicle being in a one-pedal driving mode: determine a target braking torque based on a position of the accelerator pedal, in response to a braking torque capacity of the powertrain exceeding the target braking torque, command a torque, that is equal to the target braking torque, to the powertrain such that the vehicle is slowed using the powertrain without application of the friction brakes, and, in response to the braking torque capacity of the powertrain being less than the target braking torque, (i) command another torque, having a magnitude that is less than the target braking torque by a value, to the powertrain and (ii) command yet another torque to the friction brakes that is equal to the value such that the vehicle is slowed using both the powertrain and the friction brakes.

According to another embodiment, a method of braking a vehicle when in a one-pedal driving mode includes: in response to a powertrain braking torque capacity exceeding a target braking torque based on a position of an accelerator pedal, commanding a torque, that is equal to the target braking torque, from a powertrain such that the vehicle is slowed using the powertrain without application of friction brakes; and, in response to the braking torque capacity of the powertrain being less than the target braking torque, commanding torques from the powertrain and the friction brakes such that the target braking torque is satisfied and the vehicle is slowed using the powertrain and the friction brakes According to yet another embodiment, a vehicle includes a powertrain, an accelerator pedal, friction brakes, and a controller. The controller is programmed to, in response to (i) a driver-demanded torque being negative, (ii) the vehicle being in a one-pedal drive mode, and (iii) a braking torque capacity of the powertrain being capable of providing the driver-demanded torque, command the driver-demanded torque to the powertrain such that the vehicle is slowed using the powertrain without application of the friction brakes, and, in response to (i) the driver-demanded torque being negative, (ii) the vehicle being in the one-pedal drive mode, and (iii) the braking torque capacity of the powertrain being incapable of providing the driver-demanded torque, (a) command a torque to the powertrain that is equal to the braking torque capacity of the powertrain and (b) command another torque to the friction brakes based on a difference between the driver-demanded torque and the braking torque capacity of the powertrain.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Traditionally, drivers controlled the vehicle speed by modulating the accelerator and brake pedals. The driver depresses the accelerator pedal to go faster and applies the brake pedal to slow down. Modern vehicles present an opportunity for an alternative control called one-pedal driving (one-pedal driving mode) in which the vehicle can be controlled using only the accelerator pedal to both accelerate and decelerate the vehicle.

Figure 1:
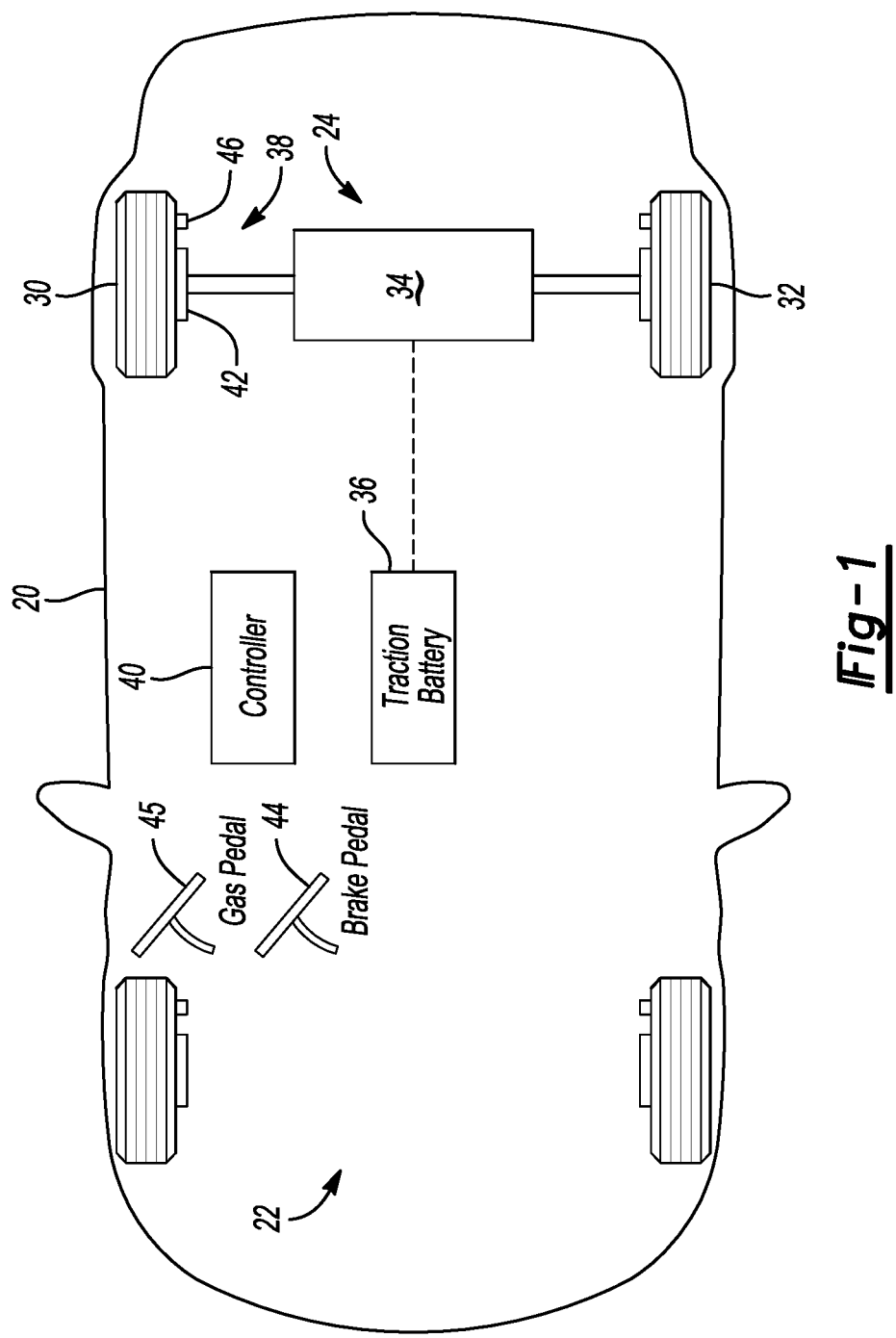
FIG. 1 is a schematic diagram of an electric vehicle.

Referring to FIG. 1, an electrified vehicle 20 is illustrated as a fully electric vehicle but, in other embodiments, the vehicle 20 may be a hybrid-electric vehicle that includes an internal-combustion engine. The vehicle 20 is shown as being two-wheel drive (such as front-wheel drive or rear-wheel drive), but may be all-wheel drive (AWD) in other embodiments. The vehicle 20 may include a powertrain 24 including a powerplant, e.g., an electric machine 34, capable of operating to accelerate (propel) or brake the vehicle 20.

The electric machine 34 is operably coupled to driven wheels 30 and 32. A gearbox (not shown) may be included to change a speed ratio between the electric machine 34 and the wheels 30, 32. The electric machine may be one or more electric machines. The electric machine 34 is capable of acting as motor to provide a positive torque to propel the vehicle 20 and is capable of acting as a generator to provide a negative torque to brake the vehicle such as via regenerative braking. The electric machine 34 may be a permanent magnet three-phase alternating current (AC) electric motor or other suitable type.

The electric machine 34 is powered by one or more traction batteries, such as traction battery 36. The traction battery 36 stores energy that can be used by the electric machine 34. The traction battery 36 typically provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 36 may be electrically connected to one or more power-electronics modules through one or more contactors. The module may be electrically connected to the electric machine 34 and may provide the ability to bi-directionally transfer electrical energy between the traction battery 36 and the electric machine 34. For example, a typical traction battery 36 may provide a DC voltage while the electric machine 34 may require a three-phase AC. The power-electronics module may convert the DC voltage to a three-phase AC voltage as required by the electric machines. In a generator mode, which may be during regenerative braking, the power-electronics module may convert the three-phase AC voltage from the electric machine 34 acting as a generator to the DC voltage required by the traction battery 36.

The vehicle 20 includes a controller 40 in electric communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data, and are stored within the memory. The controller 40 may communicate with other vehicle systems and controllers over one or more wired or wireless vehicle connections using common bus protocols (e.g., CAN and LIN). Used herein, any reference to "a controller" refers to one or more controllers. The controller 40 may include battery energy control module (BECM) that operates at least the traction battery, a powertrain control module (PCM) that operates at least the electric machine, and an ABS control module that controls the anti-lock braking system (ABS) 38.

The controllers communicate with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by a controller within each of the subsystems identified above.

The ABS 38 may be a hydraulic system, an electric system, or a combination of electric and hydraulic. The ABS 38 may be controlled by the ABS control module of the controller 40. The ABS 38 may include a brake module and a plurality of friction brakes 42 located at each of the wheels. Modern vehicles typically have disc brakes; however, other types of friction brakes are available, such as drum brakes. In an example embodiment, each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS system 38 also includes associated wheel-speed sensors 46 each located at one of the wheels. Each sensor 46 is configured to output a wheel-speed signal to the controller 40 indicative of a measured wheel speed.

The vehicle 20 is configured to brake using powertrain braking (e.g., regenerative braking), friction braking, or a combination thereof. The ABS control module includes programming for aggregating a demanded braking torque between the electric machine 34 and the friction brakes 42. The demanded braking torque may be based on driver input, e.g., a position of the brake pedal 44, or by the controller 40 in a two-pedal driving mode. The aggregator may be programmed to slow the vehicle using regenerative braking whenever possible and apply the friction brakes 42 when necessary.

The vehicle 20 includes an accelerator pedal 45. The accelerator pedal 45 includes a range of travel from a released position to a fully depressed position and indeterminate positions therebetween. The released position may be considered a zero percent position and the fully depressed position may be considered a 100 percent position. Releasing the pedal may be referred to as decreasing the accelerator pedal position, and applying the pedal may be referred to as increasing the accelerator pedal position. The accelerator pedal 45 includes an associated sensor (not shown) that senses the position of the pedal 45. The sensor is configured to output a pedal-position signal to the controller 40 that is indicative of a sensed position of the pedal 45, i.e., an accelerator pedal position. The accelerator pedal 45 is used by the driver to command a desired speed and torque of the vehicle. That is, the accelerator pedal 45 is used by the driver to set a driver-demanded torque. The driver-demanded torque may be a positive value or a negative value. A positive value indicates a propulsion torque, whereas a negative value indicates a braking torque. (A negative driver-demanded torque may be also be referred to herein as "a target braking torque.")

The controller 40 may be programmed to receive the pedal-position signal and determine the driver-demanded torque based on pedal position and other factors such as vehicle speed. During a one-pedal driving mode, the accelerator pedal is used to set a target vehicle propulsion torque when the driver-demanded torque is positive was well as a target braking torque when the driver-demanded torque is negative. The controller 40 may include multiple lookup tables or maps for determining the driver-demanded torque. These maps indicate the driver-demanded torque based on inputs such as accelerator pedal position, vehicle speed, and other factors. Different maps may be used in different drive modes. For example, one or more maps may be use when the vehicle is in a two-pedal driving mode and another map may be used when the vehicle is in a one-pedal driving mode. The maps associated with the one-pedal drive mode may include more aggressive negative driver-demanded torque values so that the vehicle is braked (powertrain, friction, or both) in response to the accelerator pedal being released so that application of the brake pedal is unnecessary in most situations. Example Table 1 and Table 2 illustrate the differences between the mapping of a two-pedal mode and a one-pedal mode for two example vehicle speeds. Note: these tables are for illustrating the concept and are not to be interpreted as limiting. In practice, complete tables would include a larger range of vehicle speeds.

TABLE 1

Driver-demanded torque in two-pedal mode

| Acc Pedal Position | Vehicle Speed | | |
|---|---|---|---|
| | 10 | 30 | 70 |
| 0 | −150 | −390 | −465 |
| 5 | 950 | 400 | 150 |
| 20 | 2430 | 1080 | 630 |
| 40 | 5010 | 3585 | 1950 |
| 60 | 5850 | 5460 | 3585 |
| 80 | 5850 | 5850 | 5295 |
| 100 | 5850 | 5850 | 5505 |

TABLE 2

Driver-demanded torque in one-pedal mode

| Acc Pedal Position | Vehicle Speed | | |
|---|---|---|---|
| | 10 | 30 | 70 |
| 0 | −2310 | −2295 | −2190 |
| 5 | −1000 | −1200 | −1400 |
| 20 | 1275 | 390 | 60 |
| 40 | 4755 | 3300 | 1770 |
| 60 | 5850 | 5460 | 3585 |
| 80 | 5850 | 5850 | 5295 |
| 100 | 5850 | 5850 | 5505 |

As shown in the example tables, the propulsion torque, for a constant accelerator pedal position generally decreases as speed increases. In contrast to the two-pedal mode, the vehicle may request a braking torque even when the accelerator pedal is depressed. The target braking torque typically increases as the position of the pedal decreases. For a given position of the pedal, the target braking torque, in one-pedal mode, may increase as vehicle speed decreases. See for example, pedal position zero.

Figure 2:
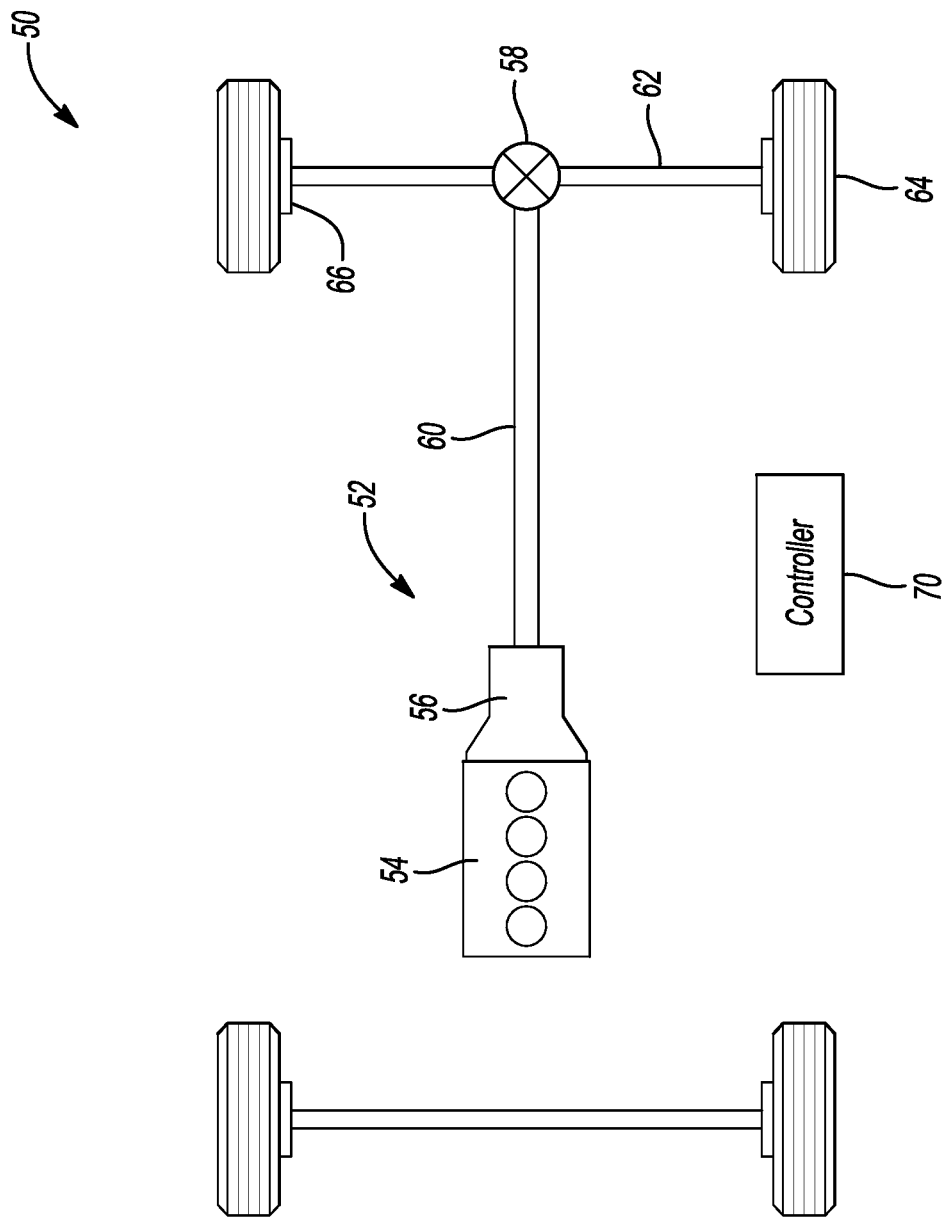
FIG. 2 is a schematic diagram of an engine-powered vehicle.

FIG. 2 illustrates another vehicle 50 according to an alternative embodiment. The vehicle 50 may have a conventional rear-wheel drive powertrain 52 that includes an internal combustion engine 54 and a multispeed transmission 56. The output shaft of the transmission is coupled to a differential 58 by driveshaft 60. The differential 58 is configured to divide the received power from the driveshaft 60 between the halfshafts 62 that connect with the driven wheels 64. As described above, the vehicle 50 includes an ABS system having friction brakes 66. The ABS system of the vehicle 50 may be as described above. The vehicle 50 also includes an accelerator pedal that may be used to control the vehicle 50 in a one-pedal driving mode as described above. A controller 70 of the vehicle 50 may include mapping for determining a driver-demanded torque based on the accelerator pedal position. The mapping may be similar to the above examples. The controller 70 may be structured similar to the controller 40. The controller 40 is configured to command a negative driver-demanded torque to the powertrain 52. The engine 54 may include an associated control module that commands actuation of the engine based on the received negative torque. For example, the engine control module may command the throttle of the engine closed to induce engine braking. Also, the transmission 56 may be shifted to increase the engine braking torque, e.g., downshifting. A bypass clutch of a torque converter may also be locked to increase powertrain braking torque. Accessories associated with the engine, e.g., an alternator, AC compressor, etc., may also be operated to increase powertrain braking torque.

One difference between the vehicle 20 and 50 is that vehicle 20 is capable of producing larger negative torques with the powertrain 24 than the vehicle 50 due to the electric machine's 34 ability to act as a generator. While the powertrain 52 of the vehicle 50 is capable of providing some negative torque through engine braking, gearing, etc., it is much more limited than an electric powertrain. Thus, the vehicle 50 may rely more heavily on friction braking during the one-pedal mode then the vehicle 20.

The vehicle may offer a one-pedal mode that is selectable by the driver through a human-machine interface (HMI) of the vehicle. The HMI may be a touchscreen, buttons, or the like. The HMI may include one or more menu pages for the one-pedal driving mode. The menu pages have selectable fields including enable/disable one-pedal driving mode and others. Generally, when in the one-pedal mode, depressing the accelerator pedal operates to accelerate the vehicle, and releasing the accelerator pedal, however, initiates powertrain braking to decelerate the vehicle without requiring application of the brake pedal. The brake pedal may still be actuated during the one-pedal mode to increase the amount of braking as needed. In one-pedal mode, the vehicle may be brought to a complete stop without requiring actuation of the brake pedal in some embodiments. In other embodiments, releasing the accelerator pedal may only slow the vehicle to a crawl speed and require driver application of the brake pedal to bring the vehicle to a complete stop. Once the vehicle comes to a complete stop, the friction brakes may be automatically applied by the controller to hold the vehicle stationary without requiring support from the electric machine.

It may be advantageous to provide all of the negative driver-demanded torque using the powertrain, e.g., regenerative braking, during one-pedal mode to charge the traction battery and increase driving range. In some situations, however, the powertrain may be incapable of providing the negative driver-demanded torque due to an insufficient powertrain braking torque capacity, i.e., the target braking torque of the vehicle exceeds the powertrain braking torque capacity. Without intervention, this will cause the vehicle to decelerate at different rates during a lift pedal condition depending upon the braking torque capacity of the powertrain. Some prior-art solutions only use the regenerative braking during the one-pedal mode and simply apply less regenerative torque when the braking torque capacity of the powertrain is insufficient. This results in inconsistence braking performance during the one-pedal mode. A better solution, as disclosed herein, is to apply the friction brakes to account for shortfalls in the powertrain braking so that the braking during the one-pedal mode is consistent regardless of the braking torque capacity of the powertrain.

The controller 40/70 may include an aggregator that, during the one-pedal mode, determines how to apply the target braking torque between the powertrain and the friction brakes. As discussed above, the aggregator may be biased to use the powertrain to provide the target braking torque. For example, the aggregator may be configured to apply all of the target braking torque with the powertrain except when the powertrain braking torque capacity is insufficient, in which case, the aggregator requests the remainder of the target braking torque to be generated by the friction brakes. The aggregator may be part of a powertrain control module (PCM) or other control module of the controller. The aggregator may use equation 1 to calculate the friction-brake torque command. When equation 1 is greater than zero, the friction-brake torque is clipped to zero as this indicates that the powertrain has full capacity to provide the target braking torque. The offset, which is optional, is a relatively small calibratable value used to behave as a debounce. In Equation 1, the input torque values are negative. For example, if the target braking torque is −100 and the powertrain capacity is −50, the Friction-braking torque would be −50. Of course, equation 1 could be rearranged to use positive sign convention.

$$\text{Friction-braking torque} = (\text{target braking torque}) - (\text{powertrain braking torque capacity}) + \text{offset} \quad \text{(Eq. 1)}$$

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
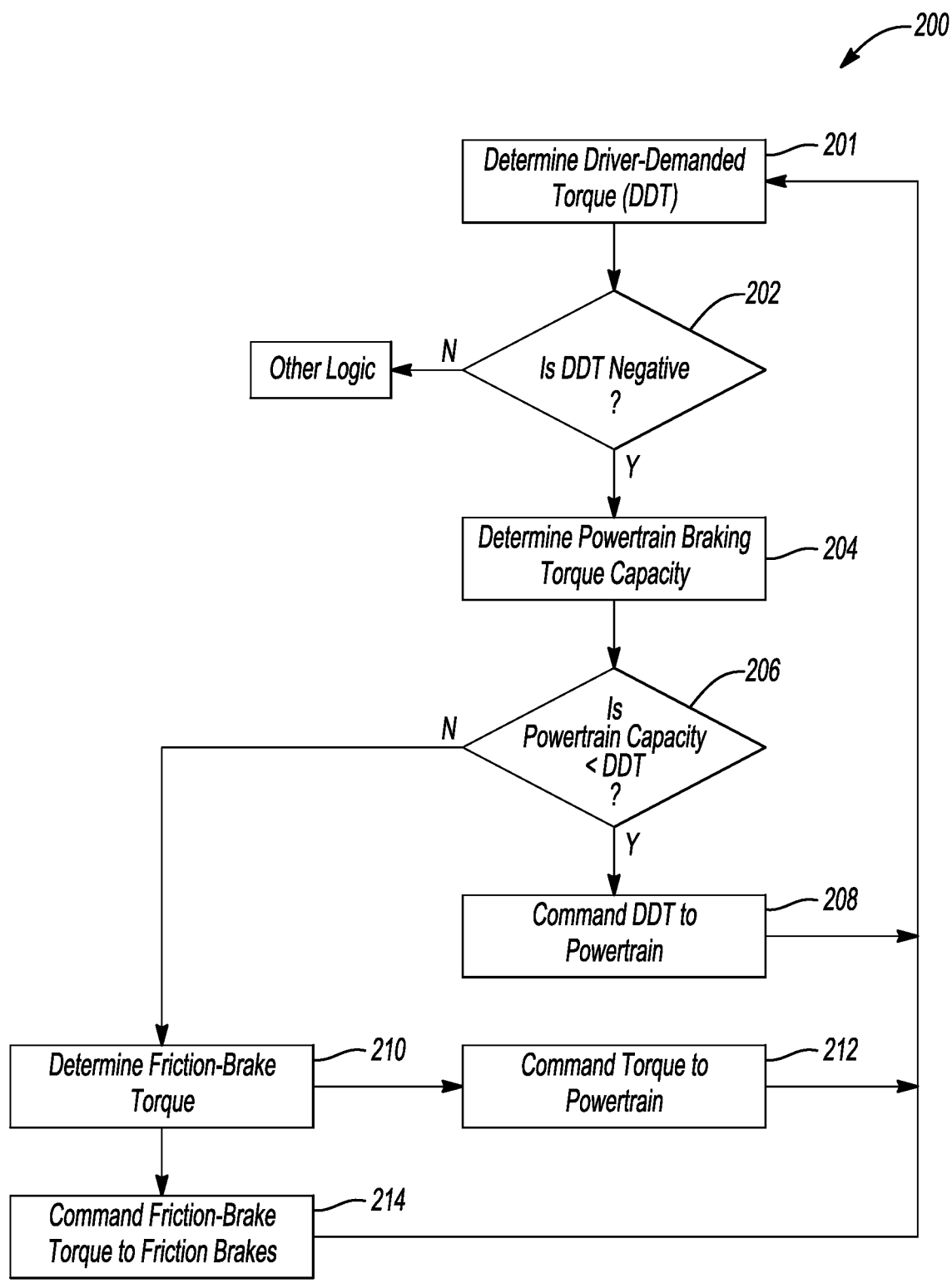
FIG. 3 is a flowchart of an algorithm for controlling braking during a one-pedal mode.

FIG. 3 is a flowchart 200 of an algorithm for controlling braking during one-pedal drive mode. The controls 200 begin at operation 202 where the controller determines the driver-demanded torque based on a position of the accelerator pedal. The driver-demanded torque may be determined based on the above-described lookup tables and mapping. At operation 202, the controller determines if the driver-demanded torque is negative. As explained above, a negative driver-demanded torque indicates a target braking torque. If the driver-demanded torque is positive, control passes to other logic as vehicle propulsion is being requested.

If the driver-demanded torque is negative, control passes to operation 204 and the controller determines the powertrain braking torque capacity. The powertrain braking torque capacity indicates the ability of the powertrain to provide the requested braking torque. The powertrain braking torque capacity may be limited by a powertrain regenerative torque limit, calibratable scalars, the driver-demanded torque, and the like. The powertrain regenerative limit may be based on the battery state of charge, the temperature of the electric machine, the temperature of the electrical distribution system, gearbox temperature, driveline hardware limits, and the like. A main limiting factor is the battery state of charge. When the battery state of charge is near full, the battery can no longer accept substantial electrical energy from the electric machine limiting the electric machine's ability to act as a generator and produce a braking torque.

At operation 206, the controller determines if the powertrain braking torque capacity is less than the driver-demanded torque. (Note, in this example, the driver-demanded torque and the powertrain capacity are negative values. Thus, a more negative value for the powertrain capacity indicates that the powertrain is capable of providing all of the target braking.) If yes, control passes to operation 208 and the controller commands the negative driver-demanded torque to the powertrain to slow the vehicle without application of the friction brakes. While outside the scope of this disclosure, the negative driver-demanded torque may be filtered and rate limited before sending the final torque command to the actuators. Therefore, the term "driver-demanded torque" contemplates possible filtering and rate limiting.

If no at operation 206, the powertrain is incapable of providing all of the target braking torque and the friction brakes must be used to supplement the powertrain. At operation 210, the controller determines the friction-brake torque using equation 1 for example. Equation 1 provides the component of the driver-demanded torque that is to be produced by the friction brakes. At operation 212, the controller commands a torque to the powertrain, e.g., commands a torque to the electric machine or controls engine braking). The torque commanded of operation 212 may be equal to the powertrain braking torque capacity. The controller also commands the friction-brake torque to the friction brakes at operation 214. Here, the friction brakes supplement the powertrain to provide the target braking torque so that the vehicle reacts consistently regardless of the powertrain's ability to produce the target braking torque.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain including an electric machine configured to power driven wheels;
   an accelerator pedal;
   friction brakes; and
   a controller programmed to, with the vehicle being in a one-pedal driving mode:
      in response to a braking torque capacity of the powertrain exceeding a target braking torque that is based on a position of the accelerator pedal, command a torque, that is equal to the target braking torque, from the powertrain such that the vehicle is slowed using the powertrain without application of the friction brakes, and
      in response to the braking torque capacity of the powertrain being less than the target braking torque, command torques from the powertrain and the friction brakes such that the target braking torque is satisfied and the vehicle is slowed using the powertrain and the friction brakes.

2. The vehicle of claim 1, wherein the braking torque capacity of the powertrain includes a calibratable offset.

3. The vehicle of claim 1 further comprising a traction battery electrically connected to the electric machine, wherein the braking torque capacity of the powertrain is based on a state of charge of the battery.

4. The vehicle of claim 1, wherein the torque and the torques are negative.

5. The vehicle of claim 1, wherein the target braking torque increases as the position of the accelerator pedal decreases.

6. The vehicle of claim 1, wherein the target braking torque is further based on a speed of the vehicle.

7. The vehicle of claim 6, wherein, for a given position of the accelerator pedal, the target braking torque increases as vehicle speed decreases.

8. A method of braking a vehicle when in a one-pedal driving mode comprising:
   in response to a powertrain braking torque capacity exceeding a target braking torque that is based on a position of an accelerator pedal, commanding a torque, that is equal to the target braking torque, from a powertrain such that the vehicle is slowed using the powertrain without application of friction brakes; and
   in response to the braking torque capacity of the powertrain being less than the target braking torque, commanding torques from the powertrain and the friction brakes such that the target braking torque is satisfied and the vehicle is slowed using the powertrain and the friction brakes.

9. The method of claim 8 further comprising determining the powertrain braking torque capacity based on a battery state of charge of a traction battery.

10. The method of claim 9, wherein the powertrain braking torque capacity is further based on a temperature of the traction battery.

11. The method of claim 8, wherein the powertrain includes an electric machine.

12. The method of claim 11, wherein the commanding a torque includes commanding the torque to the electric machine, and wherein the commanding torques includes commanding another torque to the electric machine.

13. The method of claim 8, wherein the target braking torque increases as the accelerator pedal position decreases.

14. The method of claim 8, wherein the target braking torque is further based on vehicle speed.

15. The method of claim 14, wherein, for a given position of the accelerator pedal, the target braking torque increases as vehicle speed decreases.

16. A vehicle comprising:
   a powertrain;
   an accelerator pedal;
   friction brakes; and
   a controller programmed to:
      in response to (i) a driver-demanded torque being negative, (ii) the vehicle being in a one-pedal drive mode, and (iii) a braking torque capacity of the powertrain being capable of providing the driver-demanded torque, command the driver-demanded torque to the powertrain such that the vehicle is slowed using the powertrain without application of the friction brakes, and
      in response to (i) the driver-demanded torque being negative, (ii) the vehicle being in the one-pedal drive mode, and (iii) the braking torque capacity of the powertrain being incapable of providing the driver-demanded torque, (a) command a torque to the powertrain that is equal to the braking torque capacity of the powertrain and (b) command another torque to the friction brakes based on a difference between the driver-demanded torque and the braking torque capacity of the powertrain.

17. The vehicle of claim 16, wherein the powertrain includes an electric machine configured to power driven wheels.

18. The vehicle of claim 17 further comprising a traction battery electrically connected to the electric machine, wherein the braking torque capacity of the powertrain is based on a state of charge of the traction battery.

19. The vehicle of claim 16, wherein the powertrain includes an internal combustion engine configured to power driven wheels.

20. The vehicle of claim 16, wherein the another torque is equal to the difference between the driver-demanded torque and the braking torque capacity of the powertrain.

* * * * *